United States Patent
Bornemisza et al.

(10) Patent No.: US 7,154,895 B1
(45) Date of Patent: Dec. 26, 2006

(54) SYSTEM, APPARATUS, AND METHOD FOR ATM HEADER COMPRESSION FOR DSL LINKS

(75) Inventors: Timothy Bornemisza, Middletown, NJ (US); Marc Raoul Auguste Ghislain Delvaux, Metuchen, NJ (US); Daniel Amrany, Wayside, NJ (US)

(73) Assignee: Conexant, Inc., Red Bank, NJ (US)

( * ) Notice: Subject to any disclaimer, the term of this patent is extended or adjusted under 35 U.S.C. 154(b) by 858 days.

(21) Appl. No.: 10/021,199

(22) Filed: Oct. 30, 2001

Related U.S. Application Data (60) Provisional application No. 60/255,781, filed on Dec. 15, 2000.

(51) Int. Cl.
  *H04L 12/28* (2006.01)
(52) U.S. Cl. .................. 370/395.1; 370/392; 370/474; 709/247
(58) Field of Classification Search ...................... None
  See application file for complete search history.

(56) References Cited

U.S. PATENT DOCUMENTS

| | | | | |
|---|---|---|---|---|
| 5,717,689 A | * | 2/1998 | Ayanoglu | 370/349 |
| 6,111,871 A | * | 8/2000 | Chen et al. | 370/349 |
| 6,122,759 A | * | 9/2000 | Ayanoglu et al. | 714/57 |
| 6,151,318 A | * | 11/2000 | Woodward et al. | 370/392 |
| 6,510,156 B1 | * | 1/2003 | Brock et al. | 370/395.1 |
| 6,560,206 B1 | * | 5/2003 | Naden et al. | 370/310.1 |
| 6,754,231 B1 | * | 6/2004 | Jonsson et al. | 370/474 |
| 6,963,570 B1 | * | 11/2005 | Agarwal | 370/395.32 |

OTHER PUBLICATIONS

Kotelba et al., "RTP-only Header Compression over Real-Time AAL5", Ascend Communications, ATM Forum 1998, pp. 1-15.*
Casner et al., "Compressing IP/UDP/RTP Headers for Low-Speed Serial Links", Network Working Group RFC 2508, Feb. 1999, pp. 1-24.*

* cited by examiner

*Primary Examiner*—Seema S. Rao
*Assistant Examiner*—Michael J Moore
(74) *Attorney, Agent, or Firm*—Thomas, Kayden, Horstemeyer & Risley (57) ABSTRACT

A system and method for ATM header compression for DSL links is provided. One embodiment, among others, for compressing ATM headers for communication across an ATM network involves transmitting an initial full ATM header to a receiver in the ATM network. Thereafter, when data payloads are available for transmission, the ATM header that corresponds to the data payload is compressed by either a differential technique, dictionary technique, or a multi-cell technique. The compressed ATM header and the data payload are then communicated over the ATM network to the receiver, wherein the receiver is enabled to interpret the compressed ATM header accordingly. By compressing the ATM header, a greater number of ATM cells may be communicated in the ATM network than if the ATM header were communicated in an uncompressed format.

30 Claims, 8 Drawing Sheets

ATM CELL HEADER FORMAT (UNI) 11'

| | 8 | 7 | 6 | 5 | 4 | 3 | 2 | 1 |
|---|---|---|---|---|---|---|---|---|
| BYTE 1 | GFC | | | | VPI | | | |
| BYTE 2 | VPI | | | | VCI | | | |
| BYTE 3 | VCI | | | | | | | |
| BYTE 4 | VCI | | | | PTI | | | CLP |
| BYTE 5 | HEC | | | | | | | |

SYSTEM, APPARATUS, AND METHOD FOR ATM HEADER COMPRESSION FOR DSL LINKS

CROSS-REFERENCE TO RELATED APPLICATIONS

This application claims priority to copending U.S. provisional application entitled, "ATM Header Compression for DSL Links," having Ser. No. 60/255,781, filed Dec. 15, 2000, which is entirely incorporated herein by reference.

FIELD OF THE INVENTION

This invention relates to communication systems, and more particularly to transmission techniques for networked information.

BACKGROUND OF THE INVENTION

Today's telecommunication networks are characterized by specialization. This means that for every individual telecommunication service, at least one network exists that transports this service. Each of these networks was specially designed for that specific service and is often not at all applicable to transport another service. For example, advances in audio, video, and speech coding in compression algorithms in process in VLSI technology influenced the bit rate generated by a service and thus changed the service requirements for the network. In addition, resources which are available in one network generally cannot be made available for other networks. Thus, the need for a service independent network is evident based upon these disadvantages from existing networks.

Asynchronous transfer mode (ATM) is a communication method for use in a service independent network. With ATM, information for multiple service types, such as voice, video or data is conveyed in small, fixed-size cells. ATM networks are connection oriented. ATM technology combines the benefits of circuit switching (guaranteed capacity and constant transmission delay) with the benefits of packet switching (flexibility and efficiency for intermittent traffic). ATM technology provides a scalable bandwidth from a few megabytes per second (Mbps) to many gigabytes per second (Gbps). Because of it's asynchronous nature, ATM is more efficient that synchronous technologies, such as time-division multi-plexing (TDM).

Figure 1:
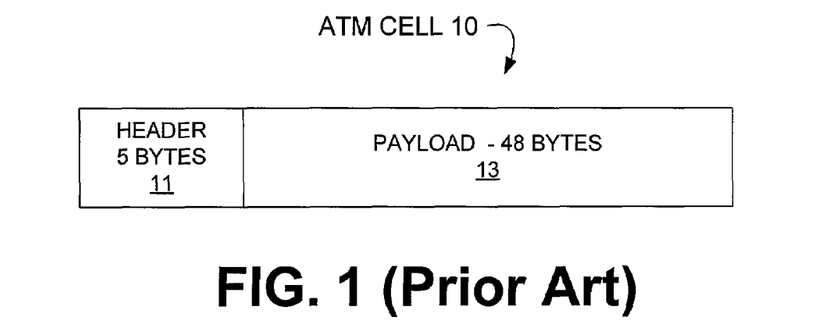
FIG. 1 is a diagram depicting an ATM cell.

ATM transfers information in fixed-size units called cells. Each cell contains 53 bytes. FIG. 1 is a diagram of the basic format of an ATM cell 10. ATM cell 10 contains a five byte header 11, which contains all of the information necessary for network management. ATM cell 10 also contains the payload 13, which is the remaining 48 bytes. Small fixed link cells are well suited for transferring voice and video traffic because such traffic is intolerant to the delay.

In reality, the ATM header 11 has a select number of bytes that are actually used, thereby resulting in a significant number of unused fields. Furthermore, a select number of bits per byte have fixed values. As there are 8 bits per byte, a total of 40 bits is sent in an ATM cell 10, standard format. The result of sending unused fields and sending bits with fixed values results in sending more bits than needed, which decreases the available bitrate. Thus, there is a need for a system and method to compress the size of the header cell so that more ATM header cells 10 can be sent in a shorter amount of time in an ATM network.

Thus, an unaddressed need exists in the industry to address the aforementioned deficiencies and inadequacies.

SUMMARY OF THE INVENTION

A system and method for ATM header compression for DSL links is provided. One embodiment, among others, for compressing ATM headers for communication across an ATM network involves transmitting an initial full ATM header to a receiver in the ATM network. Thereafter, when data payloads are available for transmission, the ATM header that corresponds to the data payload is compressed by either a differential technique, dictionary technique, or a multi-cell technique. The compressed ATM header and the data payload are then communicated over the ATM network to the receiver, wherein the receiver is enabled to interpret the compressed ATM header accordingly. By compressing the ATM header, a greater number of ATM cells may be communicated in the ATM network than if the ATM header were communicated in an uncompressed format.

Other systems, methods and features and advantages of the present invention will become more apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 2:
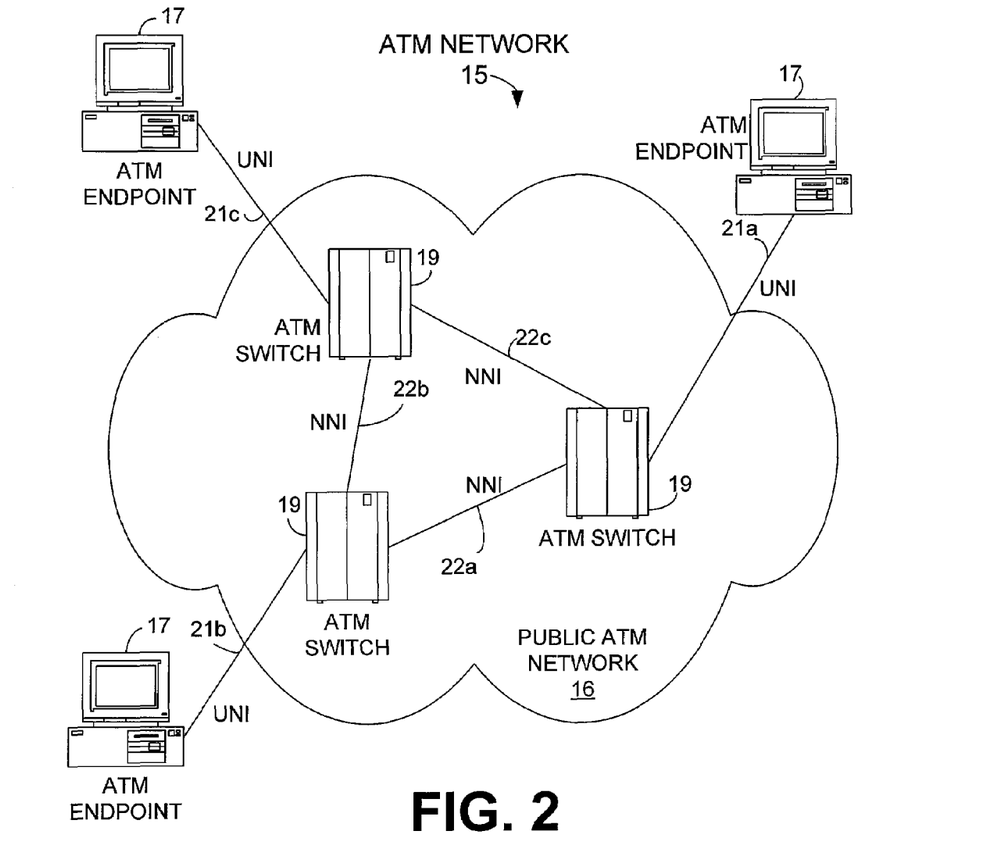
FIG. 2 is a diagram of an ATM network that can be implemented to communicate the ATM header cells of FIG. 1.

Referring now to FIG. 2, there is shown an ATM network 15 which can be implemented to communicate the ATM header cells 10 of FIG. 1. ATM network 15 is made up of ATM endpoints 17 and ATM switches 19. Non-limiting examples of ATM endpoints 17 include workstations, routers, digital service units (DSUs), LAN switches, and video coder/decoders (CODECs). The ATM endpoint 17 contains an ATM network interface adapter (not shown). The ATM endpoint 17 communicates across the ATM network 16 via a plurality of ATM switches 19. The ATM switch 19 is responsible for cell transit through the ATM network 16. The ATM switch 19 accepts the incoming cell from an ATM endpoint 17 or other ATM switch 19, reads an updates the cell header information 11 (FIG. 1), and quickly switches the cell to an output interface toward its destination.

ATM switches 19 support two primary types of interfaces: User-to-Network Interface (UNI) and Network-to-Network (NNI). The UNI connects ATM endpoints 17 to an ATM switch 19. As shown in FIG. 1, connections 21a, 21b, and 21c are UNI interfaces. The NNI connects to ATM switches 19. As shown in FIG. 2, connection 23a, 23b and 23c are NNI connections.

Figure 3:
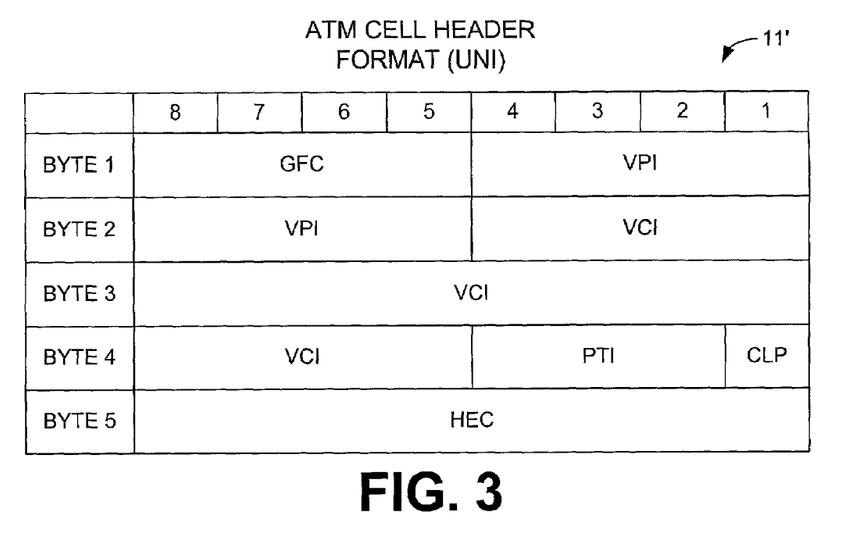
FIG. 3 is a diagram of ATM header of FIG. 1 configured for UNI header format.

ATM header cell 11 has a different format depending on whether it is UNI or NNI. FIG. 3 is a diagram of ATM header 11 of FIG. 1 configured for UNI header format 11'. For byte 1, bits 8-5 correspond to the Generic Flow Control (GFC) field. The GFC field allows a multiplexer to control the rate of an ATM terminal. The GFC can be used to provide local functions, such as identifying multiple stations that share a single ATM interface. However, the GFC field is typically not used and is set to a default value.

The next 8 bits (bits 4-1 of byte 1 and bits 8-5 of byte 2) correspond to the Virtual Path Identifier (VPI) field. VPI is used in conjunction with the Virtual Channel Identifier (VCI), as discussed below, to identify the next destination of a cell as it passes through a series of ATM switches 19 on the way to its destination. The next 16 bits of ATM header cell 11' represent the VCI. Like the VPI, the VCI is used to identify the next destination of a cell as it passes through a series of ATM switches 19 on the way to its destination.

The next 3 bits (bits 4-2 of byte 4) correspond to the Payload Type Indicator (PTI) field. The first PTI bit indicates whether the ATM cell 11' contains user date or control data. If the cell contains user data, the second PTI bit indicates congestion, and the third PTI bit indicates ATM user to ATM user information that represents a single ATM adaption layer 5 (AAL5) frame. A single bit following the PTI corresponds to the Cell Loss Priority (CLP). CLP bit indicates whether the cell should be discarded if it encounters extreme congestion as it moves through the network. If the CLP bit equals one, then the cell should be discarded in preference to cells with the CLP bit equal to zero. The final 8 bits, which are in byte 5, correspond to the Header Error Control (HEC). The HEC bits are a checksum calculated on the header 11' itself.

NNI header format vary slightly from the UNI header format described above. The difference lies in the fact that the GFC field, as discussed above in the UNI header format 11', is not present in the NNI header format. Instead, the VPI field occupies the first 12 bits of header 11'. This allows the ATM switches 17 to assign larger VPI values. With that sole exception, the NNI header is identical to the format of the UNI header 11' (FIG. 3).

Figure 4:
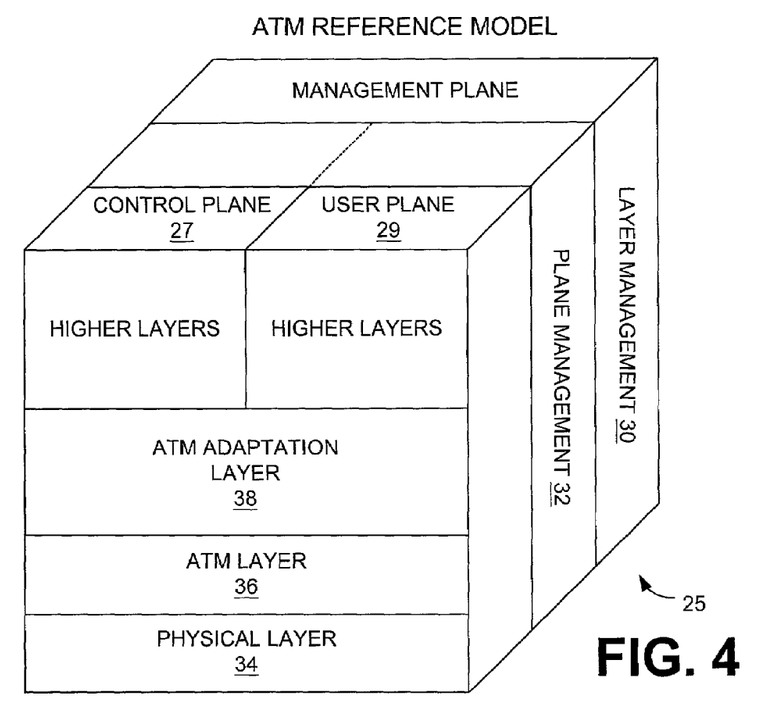
FIG. 4 is a diagram of the ATM reference model that illustrates the organization of ATM functionality and the interrelationships between the layers of functionality for communicating on the ATM network of FIG. 2.

FIG. 4 is a diagram of the ATM reference model 25 that illustrates the organization of ATM functionality and the interrelationships between the layers of functionality. The ATM reference model 25 is composed of several planes that span all layers. A control plane 27 is responsible for generating and managing signal requests. User plane 29 is responsible for managing the transfer of data. The management plane contains both a layer management plane 30 and a plane management layer 32. The layer management plane 30 manages layer-specific functions, such as the detection of failures and protocol problems, while plane management layer 32 manages and coordinates functions related to the complete system.

The physical layer 34 controls transmission and receipt of bits on the physical medium. It also keeps track of ATM cell boundaries and packages cells into the appropriate type of frame for the physical medium being used. The physical layer 34 is divided into two parts: the physical medium dependent (PMD) sub-layer and the transmission convergent (TC) sub-layer. The PMD sub-layer (not shown) is responsible for sending and receiving a continuous flow of bits with associated timing information to synchronize transmission and reception. Because of the PMD sub-layer, it uses physical medium dependent functions, and its specification depends on the physical medium used. Examples of physical medium standards for ATM include Synchronous Optical Network/Synchronous Digital Hierarchy (SONET/SDT), DS-3/E3, 155 Mbts over multi-mode fiber (MMF) using the 8B/10B encoding scheme, and 155 MBPS 8B–10B over shielded twisted-pair (STP) cabling.

The TC sub-layer is responsible for five functions. The lowest function is generation and recovery of the transmission frame, which generates and maintains the appropriate physical-layer frame structure. The next function, transmission frame adaptation, takes care of all actions to adapt the cell flow according to the used payload structure of the transmission system in the sending direction. The TC sub-layer packages ATM cells into frames acceptable to the particular physical layer implementation. A cell delineation function maintains boundaries for ATM cell 10. A header error control sequence generation and verification function generates and checks the header error control code to ensure valid data. Finally, a cell rate decoupling function inserts or suppresses idle (unassigned) ATM cells 10 to adapt the rate of valid ATM cell to the payload capacity of the transmission system. It also suppresses all idle cells in the receiving direction.

ATM layer 36 is responsible for establishing connections in passing cells through the ATM network 16 (FIG. 2). To do this, it uses the information contained in the header 11 of each ATM cell 10.

The ATM adaptation layer 38 (AAL) translates between the larger service data units (i.e., video streams and data packets) of upper level processes and ATM cells 10. Specifically, the AAL 38 receives packets from upper level protocols and breaks them into the 48-byte segments that form the payload field 13 of an ATM cell 10. Several AAL layers 38 are currently specified; however, ATM adaptation layer type 5 (AAL5) is discussed in detail below.

AAL5 is the primary AAL for data and supports both connection-oriented and connection-less data. It is used to transfer most non-switched multi-megabit data service data, such as classical IP over ATM and LAN Emulation (LANE).

Returning to FIG. 3, the HEC performs up to three functions: error correction, error detection, and cell delineation. HEC error correction is useful just when the typical errors are isolated single bit errors, and is explicitly forbidden for PMD where single bit errors are not present. In fact, error correction is only useful for systems using plain NRZ (Non-Return-to-Zero) encoding with limited impulse noise.

ATM header error detection is actually strengthened when error correction is disabled; however, error detection is not overly useful at the ATM layer 36. Table 1 below shows the effects of typical scenarios with and without ATM error detection. Table 1 assumes that the remaining portions of the ATM header 11 are not modified, and it also assumes that the ATM flow is primarily used for a data connection, using AAL5.

TABLE 1

Impact of absence of HEC error detection.

| Scenario | With error detection | Without error detection |
|---|---|---|
| No error | | |
| Error in CLP | Packet loss | Very limited impact on QoS |
| Error in PT[0] | Packet loss | |
| Error in PT[1] | Packet loss | Very limited impact on QoS |
| Error in PT[2], 0 → 1 | Packet loss | Packet loss and incorrect OAM detected |
| Error in PT[2], 1 → 0 | Loss of OAM cell | Packet loss (note that OAM cells are rare) |
| Error in VPI/VCI | Packet loss | Packet loss and possibly cell misinsertion (with normally low probability depending on Hamming distance between active VPI/VCI) |
| Error in GFC | Packet loss | No impact |

As shown in Table 1, the impact of error detection of the ATM header level may in fact have a negative impact at the AAL5 layer. This impact is limited because the ratio between header 11 and payload 13 lengths. It should also be noted that any error in payload 13 also results in packet loss.

When RS (Reed-Solomon) encoding is used, the value of the HEC error detection is further reduced as essentially two cases are present: no error or many errors. This is a consequence of the steepness of the bit error rate (BER) versus the signal-to-noise ratio curve (SNR) and the characteristics of impulse noise on DMT based systems. Thus, if RS coding is present, it is simpler to drop a full symbol worth of data instead of looking at the ATM header of highly corrupted cells, which results in packet loss even if the ATM header is correct. If RS encoding is not present, the value of the ATM header error detection is related to the noise characteristics, which is generally not useful for impulse noise.

Since HEC error detection is not really a useful function, especially for AAL5 data connections, the HEC can be completely removed, if cell delineation may be achieved by other means. Removing the HEC bits results in an improvement of the application bit rate by approximately 2%. However, whether cell delineation may be achieved by other means depends upon whether the cell length is fixed or unfixed. Methods to achieve cell delineation may be implemented for fixed and unfixed cell length cases.

If fixed cell links are present, cell delineation is performed once during start-up. This may be accomplished by using a shared conviction between the send and transmit side (between two devices in an ATM network 16). Cell delineation may be performed with the first byte of the first show time DSL superframe being the first byte of a cell. Both ends of a DSL link are able to count frames and frames are of known length. Counting bits may be accomplished by starting from a known reference. If by convention, bit 0 is also the start of the first cell, then a cell starts periodically at bit n*L, where L is the fixed length of a cell. Theoretically, frame offset can be calculated and maintained as long as superframe synchronization is maintained, which essentially is as long as the show time itself. Nevertheless, it may be advantageous to periodically indicate cell boundaries as a check mechanism.

There are several ways of encoding cell boundaries. As one non-limiting example, one method for encoding cell boundaries includes having an explicit offset value from a reference point. This example may be coded by stealing one data byte on a periodic basis, by using currently unused indicator bits, or by using AOC/EOC messages. In fact, rather than stealing an entire data byte, taking only six bits may be sufficient when coding a byte offset. When the offset is carried in messages (i.e., by EOC messages), it is possible to include the message on demand from the remote side to confirm that alignment is still correct after detection of serious errors. This may be more useful for some forms of variable length coding as discussed below.

Cell boundaries may be encoded by having one bit that indicates a specific value for cell offset, such as one bit which indicates that for the next superframe, the cell start and the superframe start are aligned. However, this non-limiting example may not be ideal for certain frame lengths, such as if the superframe length is a multiple of the cell length. As an alternative, a related non-limiting example may be implemented to send an offset value bit per bit (i.e., one bit per frame) with an encoding similar to AOC messages. Other non-limiting examples for encoding cell boundaries include manipulating the PMD to insert a low bit rate number (i.e., pilot tone manipulation); reusing the indicator bits used for HEC related defects; or using redundant information in the compressed header. Therefore, through any of these non-limiting examples, the HEC may be removed to thereby increase the application bit rate by a nominal amount.

It should be understood that modifying the way that cell delineation is performed may have impact on performance and performance monitoring. In general, the methods proposed above may take longer to resynchronize than standard HEC delineation processes. However, linking the cell delineation to the superframe makes losing cell delineation highly unlikely; consequently, the result then is that a higher level of performance is achieved.

In another embodiment of the invention, the first four bytes of the ATM header may be reduced to one or two bytes and still carry the same information as the complete ATM header 11 in FIG. 1. This is accomplished when compression is dictionary based—when the compression is not dependent on any other cell previously received. According to this embodiment, the VPI/VCI value is replaced with an index table of VPI/VCI values currently active on the DSL link in an ATM network.

Several non-limiting examples may be implemented to compress the ATM header 11 to approximately a one byte header. In a first non-limiting example, one bit may be implemented to communicate a continuous toggle pattern in time, (i.e., 0101) to validate alignment. This could also be used as a parity bit or some other framing information for cell delineation. Another non-limiting example for stateless compression provides that three bits may carry the original PTI bits; however, this non-limiting example assumes that the CLP is fixed or unimportant, which is generally true for access networks. A third non-limiting example provides that four bits are implemented to carry a connection index that is associated with a given VPI/VCI pattern.

Each of the three non-limiting examples described above, however, provide that the receiver has tables of VPI/VCI patterns. The tables are either defined with the assistance of the ATM layer 36. The table may be established upon initiation of the connection and also is updated in the transceiver. The consequence of this embodiment is that the transceiver is not transparent for the ATM layer 36. Alternatively, the transmitter may control a receiver table, which provides that once a new header is received, the transmitter sends a table update message to the receiving end containing the VPI/VCI pattern and the associated table index prior to sending a compressed header using the new VPI/VCI pattern or fixed link cells, it is preferred to send a full cell as the update message. It should also be noted that the table should be refreshed periodically to overcome situations in which the table received at the receiving end contained errors through transmission.

The previous implementations discussed above typically include a configuration step, which requires that tables are filled inside DSL chips in the transmitting and receiving end at the time of ATM connection setup. However, many configurations are characterized by a single high speed ATM connection; therefore, there exists a high probability of consecutive ATM headers that are either equal or nearly equal but possibly interleaved with idle cells. As a non-limiting example, it may be typical for a one bit difference for the last cell of the packet in AAL5.

Figure 5A:
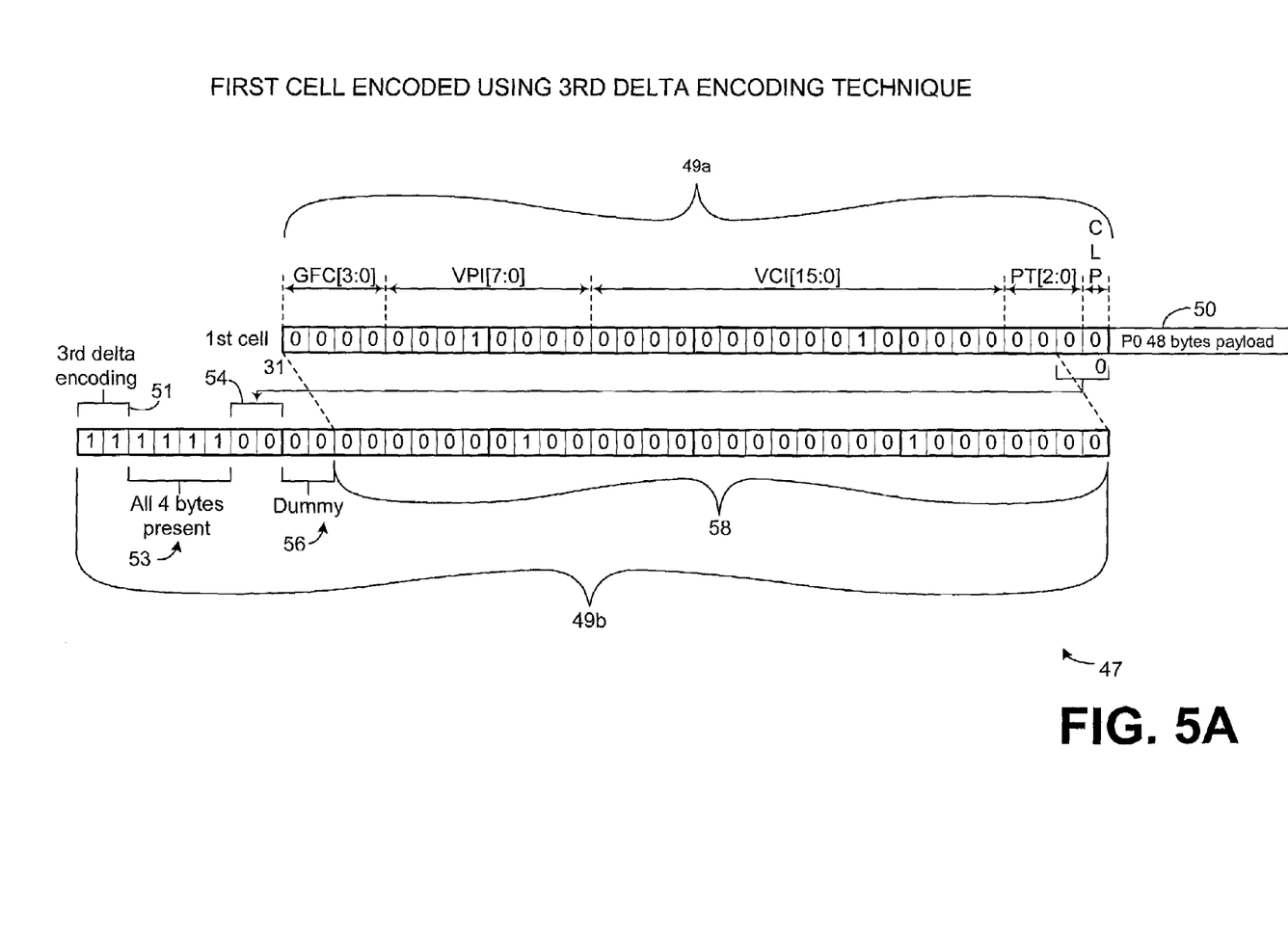
FIGS. 5A, 5B, and 5C are diagrams of bit map encoding techniques that may reduce the ATM header of FIGS. 1 and 3 to approximately one byte.
Figure 5B:
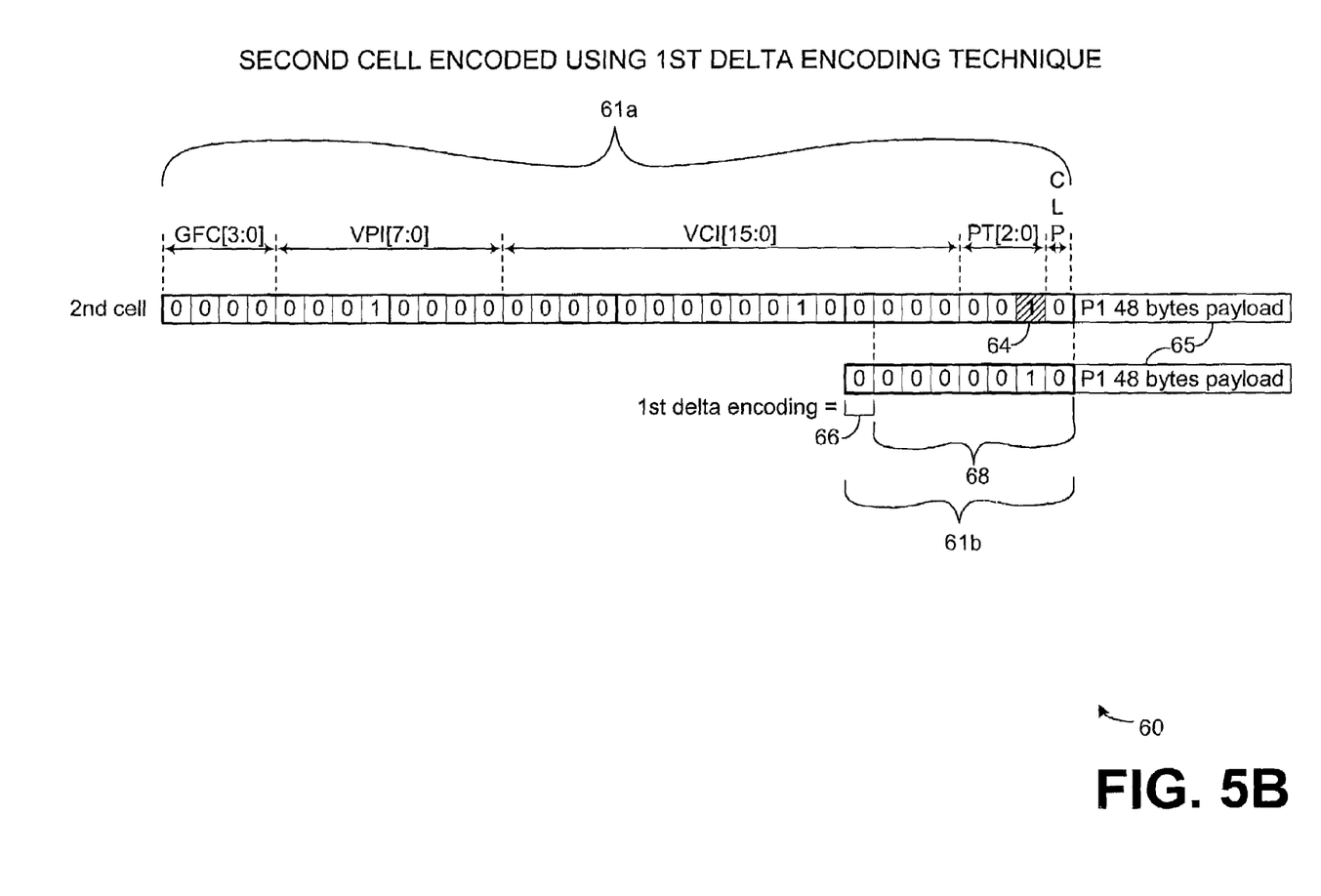
Figure 5C:
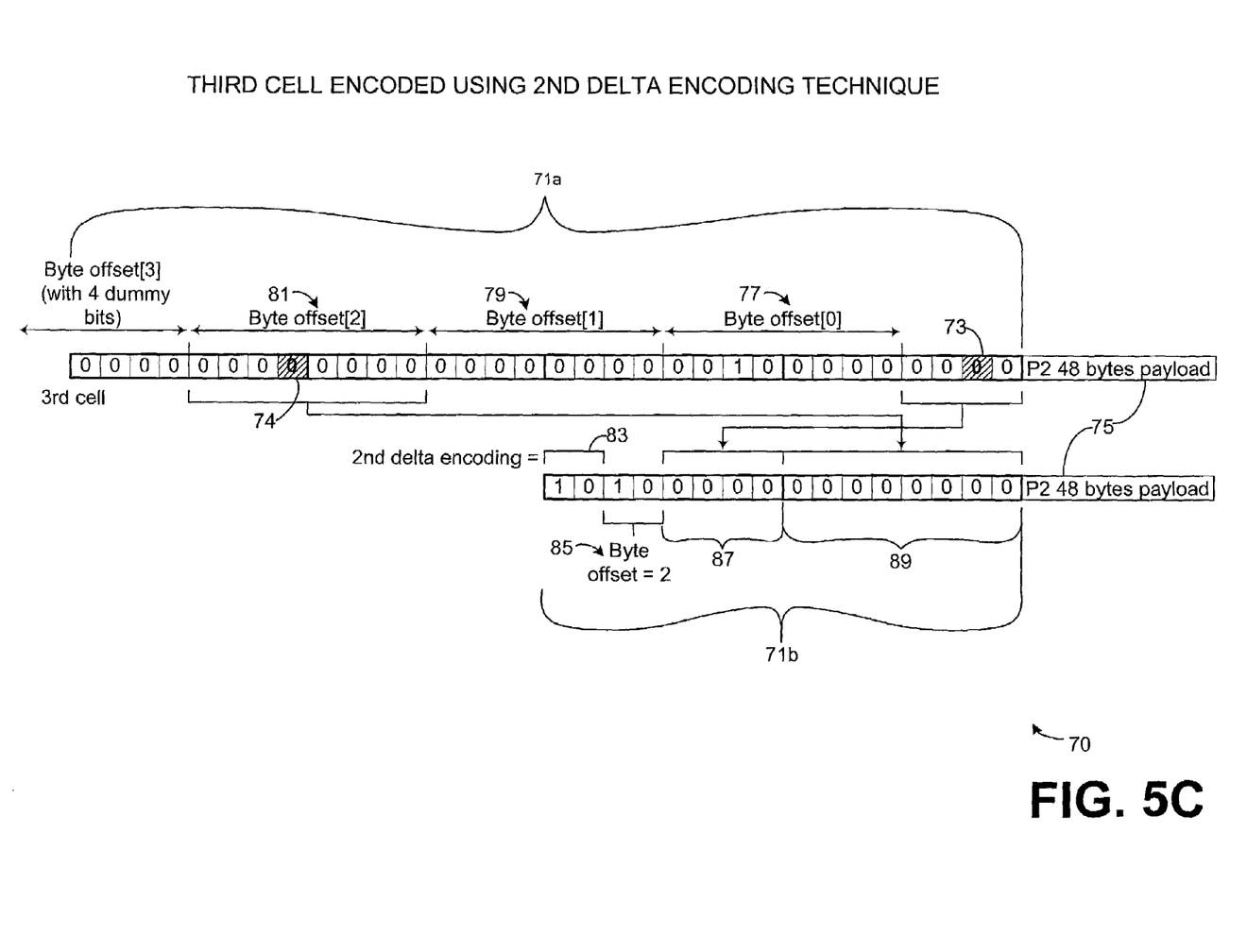

Differential based solutions may be implemented to avoid having to implement preliminary configurations, as discussed above. With a differential based model, typically one pattern is retained with the possibility of a one-bit difference introduced by the previous packet. FIGS. 5A, 5B, and 5C are diagrams of bit map encoding techniques that may reduce the ATM header 11 to approximately one byte without preliminary configurations while also retaining state.

In FIG. 5A, the non-limiting compression example corresponding to reference numeral 47 depicts a third delta encoding instance. In this instance, a first cell 49a is transmitted. Thus, the full header is communicated to the receiver. A first cell 49a contains four header bytes and is followed by 48 bytes of payload 50. As discussed above, the 8 HEC bits are removed since they can be represented by other techniques. The encoded version of header 49a is represented as encoded header 49b, which implements third delta encoding. With third delta encoding, a maximum of 32 bits change. One to four bytes may be identified by identifying bits corresponding to reference numeral 53 with two predefined initial bits 51. Following identifying bits 53 are two bits 54, each corresponding to the payload type (PTI) and cell loss priority (CLP). Two dummy bits 56 follow the CLP bit, and that is followed by the remaining portion of first header cell 49a. Therefore, in this non-limiting example 47, third delta encoding is implemented resulting in the transmission of five header bytes.

In a second non-limiting compression example 60 shown in FIG. 5B, a second cell 61a is shown wherein bit 1 (reference numeral 64) is altered from the first cell 49a shown in FIG. 5A. The payload 65, which is configured as PTI [1], follows second cell 61a. In this compression example 60, first delta encoding is implemented so that second cell 61a becomes compressed header cell 61b which is one byte. When implementing first delta encoding, a maximum of seven predefined bits may change from cell to cell, and bits are selected as the most change prone. Thus, here first bit 66 indicates first delta encoding is applied and bit 6-0 (reference numeral 68) correspond to the changes made to second cell 61a.

The non-limiting compression example 70 in FIG. 5C is an example of second delta encoding. Third cell 71a contains changes at PTI [0] (reference numeral 73) and VPI [5] (reference numeral 74). Payload 75 follows the third cell 71a.

When compressed, third header cell 71a becomes compressed header cell 71b, which is represented as a two-byte header. As an example of second delta encoding, a maximum of 12 bits may change wherein one byte is identified by a variable offset with four predefined bits. Thus, as shown in FIG. 5C, reference numeral 83 corresponds to the first two bits which indicate that second delta encoding is implemented. The next two bits 85 indicate that the byte offset is equal to 2. The next four bits 87 are the four predefined bits which correspond to bit numbers 3-0 of third cell 71a. Thereafter, the byte 89, which contains the modified bit (VPI[5]), follows, as it corresponds to the second byte offset.

Byte offset is determined based upon the four predefined bits that correspond to bits 3-0 of third cell 71a. Each byte offset is thereafter calculated based upon the following 8 bit segment after bit 3. Stated another way, byte offset [0] (reference numeral 77) corresponds to bits 11-4 of third cell 71a. Similarly, byte offset [1] (reference numeral 79) corresponds to bits 19-12 of third cell 71a. Byte offset [2] (reference numeral 81) corresponds to bits 27-20 of third cell 71a.

When an idle cell is transmitted, it signifies no change in the dictionary maintained at the receiving end. An idle cell may be configured wherein bits 1-0 are free and may be used, for, as a non-limiting example, error control. Bits 5-2 are mapped as zeroes, and bits 6 and 7 are mapped as ones. Except for idle coding, the dictionary entry is updated to be the current header after delta.

It is evident from the example shown in FIGS. 5A, 5B, and 5C that the header may become a variable length based upon the encoding technique applied. As a result, it is possible to experience bit errors that get translated into loss of synchronization. Consequently, as described above, cell delineation and cell boundary recognition techniques may be implemented for re-synchronization. As a non-limiting example, it is possible to use idle insertion without data so that re-synchronization is accomplished when enough idle headers are present. Thus, by inserting a sufficient number of idle headers, re-synchronization can easily be accomplished. In reality however, the expected header length in many ATM networks is one byte, thereby rendering synchronization loss as an essentially improbable event.

A similar effect is error manipulation if a corrupted delta is used at the receiver. This can easily be overcome, however, by periodically refreshing the receiver state. It is possible periodically refresh the receiver and still maintain an expected header byte by modifying a previous transmitted table into a subsequent table. This is accomplished by directing the transmitter to continuously send the first messages while varying the nibble offset, as the expected behavior is no change. Table 2 below exhibits a delta encoder with a nibble index and nibble value.

TABLE 2

Delta encoding Tables Using Nibble Offset to Modify a Previously Sent Header

| Delta | Bit 7 | Bit 6 | Bit 5 | Bit 4 | Bit 3 | Bit 2 | Bit 1 | Bit 0 |
|---|---|---|---|---|---|---|---|---|
| Maximum 4 bits may change from cell to cell with 3 giving the nibble index and the nibble value encoded in the 4 LSB. | 0b | Nibble index | | | Nibble value | | | |
| Maximum 12 bits change, one byte identified by a variable offset and 4 predefined bits. The new byte follows this one. | 1b | 0b | Byte offset | | | | PTI | CLP |

TABLE 2-continued

Delta encoding Tables Using Nibble Offset to Modify a Previously Sent Header

| Delta | Bit 7 | Bit 6 | Bit 5 | Bit 4 | Bit 3 | Bit 2 | Bit 1 | Bit 0 |
|---|---|---|---|---|---|---|---|---|
| Maximum 32 bits change, 1-4 bytes identified by a bit map and two predefined bits. The new byte(s) follow this one. | 1b | 1b | Bit map of modified bytes, all zero is not needed and used for idle encoding | | | | PTI [0] | CLP |
| Idle cell, no change in dictionary | 1b | 1b | 0b | 0b | 0b | 0b | Two free bits e.g. error control, . . . | |

As shown above, the nibble value is encoded in the four least significant bits (bits 3-0). The nibble index is encoded in the next three least significant bits, which correspond to bits 6-4. Second and third delta encoding may be implemented in this example as previously shown in FIGS. 5A, 5B, and 5C.

Since most ATM cells 11 (FIG. 1) in a given stream are likely to have the same header as they communicate with a single VPI/VCI, and the PTI will likely change just at the end of an AAL5 packet, it is possible to encode several ATM cells with a single overhead byte. This is known as multi-cell encoding. A multi-cell solution can greatly reduce the amount of bandwidths spent on overhead with a small amount of latency, which become less significant as data rates increase. Table 3 is an example depicting a multi-cell control byte structure.

TABLE 3

Control-byte Structure for a Multi-cell Solution

| Meaning | bit 7 | bit 6 | bit 5 | Bit 4 | bit 3 | bit 2 | bit 1 | bit 0 |
|---|---|---|---|---|---|---|---|---|
| Case 1: The next byte will be another control byte | 0b | Table Reset | Rsvd | Challenge | Reply | Sync bit | Reserved | |
| Case 2: The next 4 bytes will contain an ATM header to be added to the table at Index [5:3]. After that, the data packet begins. | 1b | 0b | | Index | | Extra bit | Cell Count | |
| Case 3: The next byte will begin the ATM data packet using the header already at index [5:3] in the table | 1b | 1b | | Index | | Extra bit | Cell Count | |

Case 1 is analogous to an idle situation. This byte is sent to indicate that there is no actual data to be sent. It is also sent as a messaging and handshake byte. In bit 6 of case 1, Table Reset indicates to the receiving side that it should clear and rebuild its ATM header table. The Table Reset is also useful for re-synchronizing after a data error. In bit 4, the Challenge bit is implemented for initial handshake and synchronization. The Challenge bit indicates to the receiving side that is to respond with a Reply bit. The side issuing the challenge should not send ATM data until it receives a control byte with the Reply bit set. Bit 3 in case 1 is the Reply bit described above. The Reply bit acknowledges the challenger of the other side and indicates that both the transmit and receive of the replying side are operational and synchronized. In bit 2 of case 1, the synchronization bit may be toggled between 1 and 0 to indicate continued synchronization.

Cases 2 and 3 of Table 3 indicate that data is being sent and that a header should either be added to the receiver table or can already be found at a location specified by the index. In both cases 2 and 3, the cell count bits (bit 1-0) indicates that ATM cells are being sent with no additional overhead bytes and that the ATM cells are to use the same header as indicated in index bits 5-3. This reduces the best-case overhead to an average of 2 bits per 48 byte ATM data cell 10 (FIG. 1). In practice, however, the overhead may be somewhat higher. This method scales well with higher traffic demands since higher traffic generally leads to larger AAL5 packets. This means that there are more consecutive cells with the exact same header with only the occasional AAL5 in the packet indicator breaking up the groupings.

The Extra bit 2 in cases 2 and 3 of Table 3 can be used to increase the range of the cell count bits or index bits. It may also be used a sync-bit so as to provide a synchronization check during data transfers as well as idle periods. The Extra bit 2 may also indicate that the last cell in the grouping (as indicated by cell count) is the end of the AAL5 packet, and the header merely differs as PTI [0].

The encoding techniques described above in reference to FIGS. 5A, 5B, and 5C may be implemented in the ATM network 16 of FIG. 2. More specifically, the ATM endpoints 17, which may be a PC, includes a DSL modem (or similar ATM communication device) for both transmitting and receiving ATM header 10 information. The DSL modem or other communication device in ATM endpoint 17 is comprised of requisite hardware and software for transmitting and receiving ATM header packets 10.

Figure 6A:
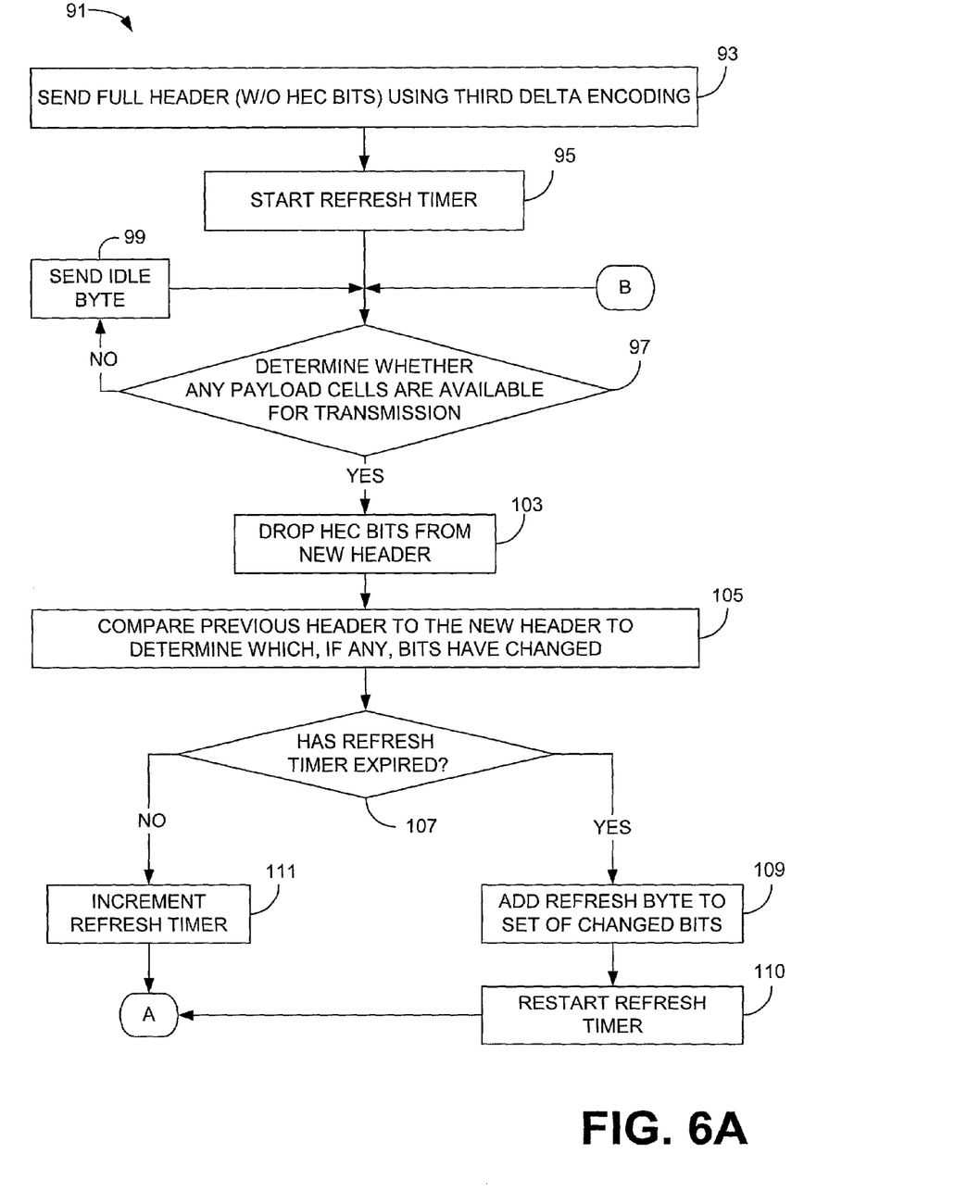
FIGS. 6A and 6B comprise block diagram of the steps for compressing an ATM header in FIGS. 1 and 3 for transmission over the ATM network of FIG. 2.
Figure 6B:
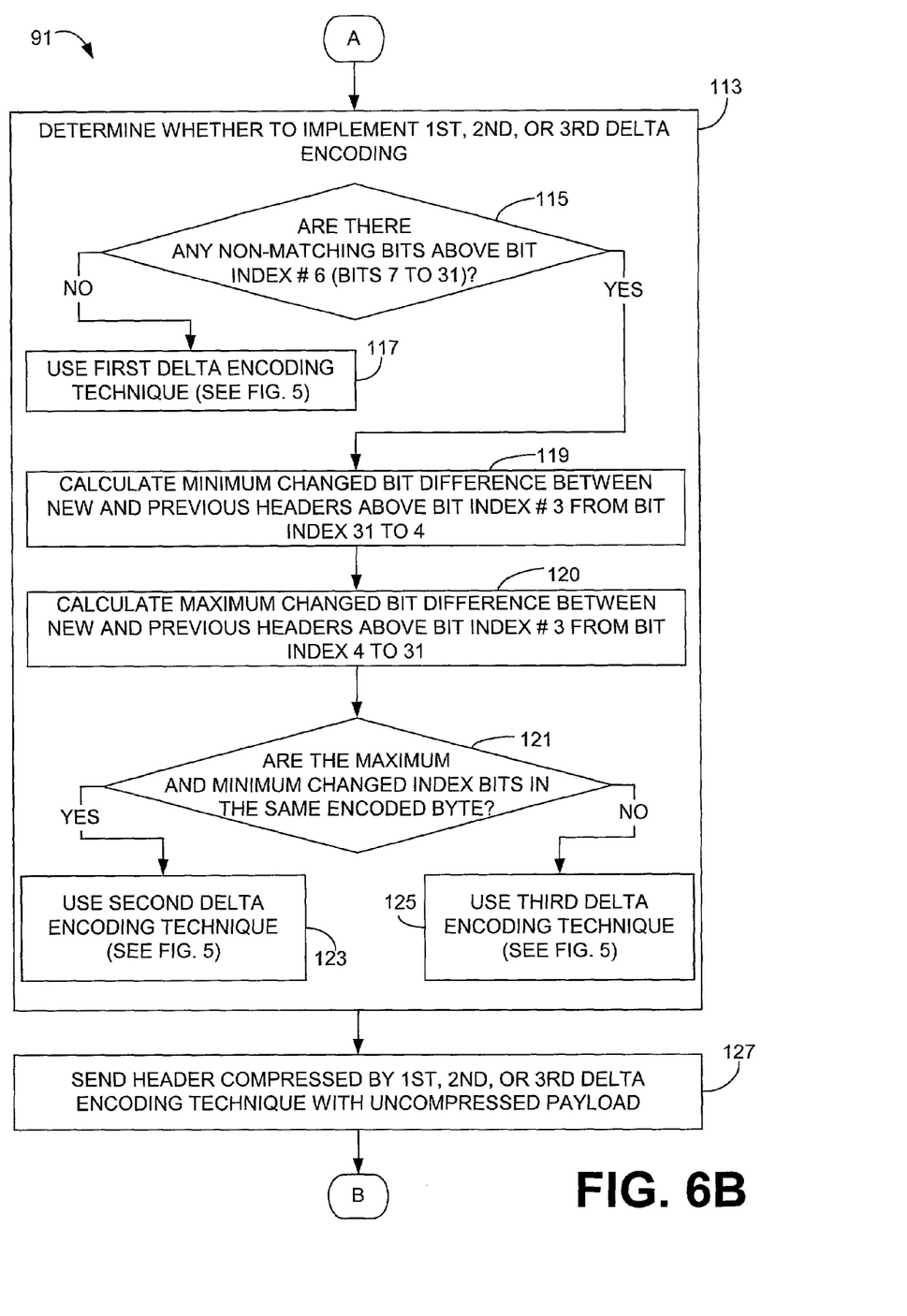

FIGS. 6A and 6B comprise a block diagram of the steps 91 for compressing an ATM header for transmission over an ATM network 16 using the delta encoding techniques described above. Upon initialization in step 93, the full ATM header without the HEC bits (bit index 7-0 if byte 5 is FIG. 3) is sent using third delta encoding. First cell 49b in FIG. 5A is a non-limiting example of an ATM header 11 encoded using the third delta encoding technique. After the full header is sent in step 93, the refresh timer is initiated in step 95. The refresh timer is implemented to protect against transmission errors. A refresh corresponds to sending bits that are in fact unchanged. Thereafter, the determination is made, in step 97, of whether there are any payload cells 13 (FIG. 1) available for transmission. If not, an idle byte is transmitted in step 99 and the process loops back to the determination step of 97. This loop continues until the determination is made that a payload cell 13 (FIG. 1) is available for transmission.

When a payload cell 13 (FIG. 1) is available for transmission, the HEC bits are removed from the new header in preparation for transmission, as in step 103. In step 105, the number of changed bits in the new header, as compared to the previously sent header, is determined. The result of the number of changed bits will subsequently determine whether first, second, or third delta encoding is implemented.

Before the encoding technique is actually determined however, a decision is made whether the refresh timer has expired, as in step 107. If so, a refresh byte is added in step 109 to the set of changed bits determined from step 105. Subsequently, the refresh timer is restarted as shown in step 110. Returning to step 107, if it is determined that the refresh timer has not expired, the refresh timer is incremented in step 111 so that at some point in the future, step 107 will result in a true statement.

Turning to FIG. 6B, the next step in the process is to determine whether to implement the 1st, 2nd or 3rd delta encoding technique, as in step 113. The 1st, 2nd and 3rd deltas are not mutually exclusive. In fact, the 1st delta is completely enclosed in 2nd delta encoding. Furthermore, 2nd delta encoding is completely enclosed in 3rd delta encoding and the 3rd delta encoding covers all possible delta patterns. As it is advantageous to minimize the length of the compressed headers, it is naturally preferable to select 1st delta encoding over 2nd delta encoding and 2nd delta encoding over 3rd delta encoding. This is shown in FIG. 5B, which shows that example 60, which is 1st delta encoding, is a smaller compressed header than example 70 (FIG. 5C), which is 2nd delta encoding. Similarly, example 70 (FIG. 5C) is smaller compressed header than the compressed header in example 47 (FIG. 5A). Thus, the process in step 113 determines the most desirable encoding technique to render the most compressed header.

Contained within step 113 are a series of substeps for determining the proper encoding technique. The first such step is decision 115, which determines whether there are any non-matching bits in bit index positions 7 to 31. If there are not, the first delta encoding technique is implemented, as in step 117, since bits 7-31 are unchanged. An example of this encoding technique is exemplified in compressed ATM header 61b of FIG. 5B.

If, however, there are changed bits in bit positions 7-31, a calculation is made, in step 119 to determine the minimum changed bit difference from the new to the previous header. More specifically, the process disregards the 1st four least significant bits (bits 3-0) and determines the minimum changed bit in the range 4 to 31 in the header. As a non-limiting example, as shown in FIG. 5C, the third cell 71a (of example 70) has a minimum change bit in bit position 24.

Step 120 makes a determination similar to step 119, except that the maximum change bit difference between the new and previous header is determined. Step 120 likewise disregards the three least significant bits and determines the maximum change bit from bit 4 to bit 31. As shown in third cell 71a of FIG. 5C, the maximum change bit is bit 24.

In step 121, a determination is made of whether the maximum minimum change index bits are in the same encoded byte. If so, the 2nd delta encoding may be used in step 123. Looking at third cell 71a in example 70 in FIG. 5C, the maximum and minimum changed bits are in the same byte (because they are actually the same bit). Thus 2nd delta encoding can be caused to create compressed header 71b in FIG. 5C.

If the maximum and minimum change index bits are not in the same encoded byte, as determined in step 121, the 3rd delta encoding technique is used, as shown in step 125. Finally, in step 127, the compressed header which was encoded by the 1st, 2nd or third delta encoding technique determined above is transmitted with the uncompressed payload. Thereafter, the process reverts back to step 97 to determine the availability of future payload cells.

Figure 7:
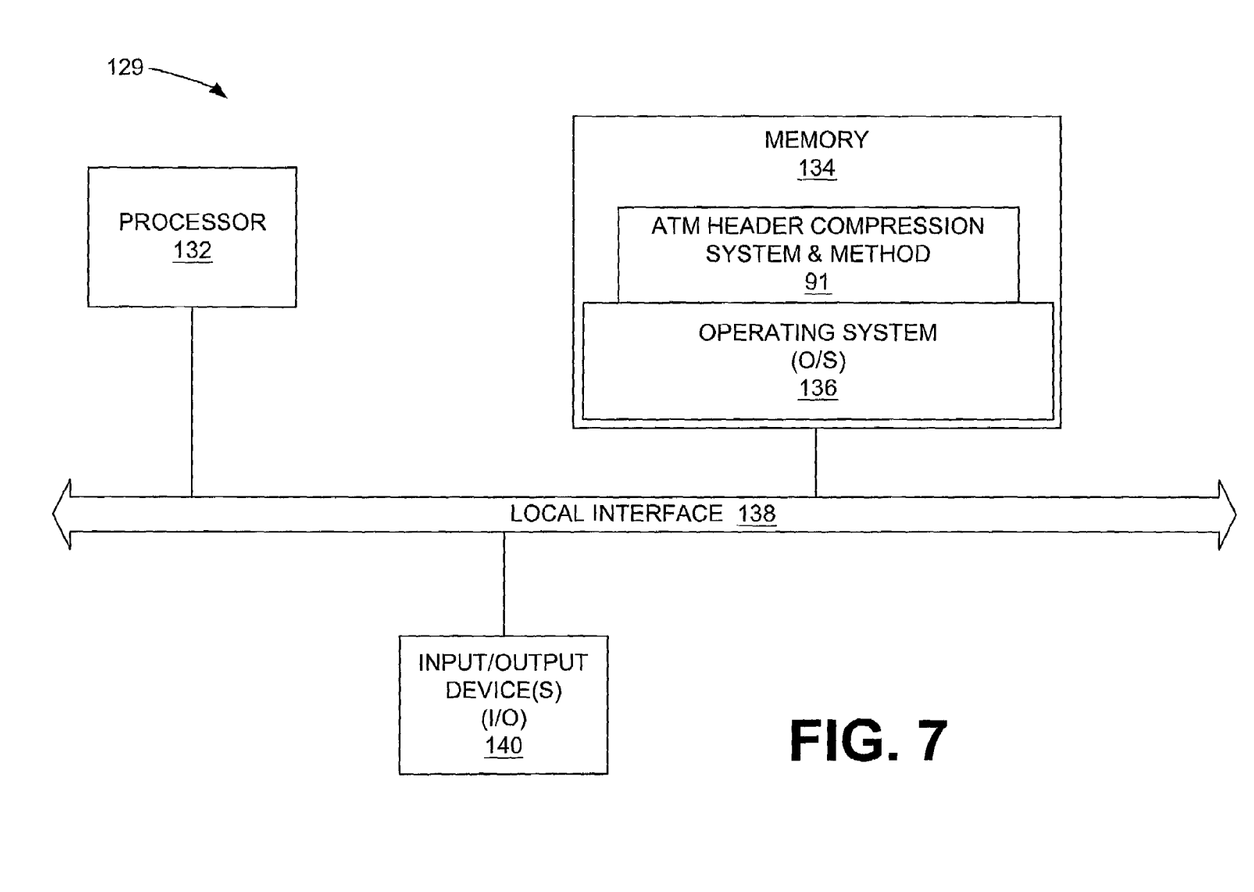
FIG. 7 is a diagram of a general purpose computer that can implement the ATM header compression method and process on the ATM network in FIG. 2.

The ATM header compression method and process can be implemented in software (e.g., firmware), hardware, or a combination thereof. In one embodiment among others, the ATM header compression method and process is implemented in a combination of hardware and software, as an executable program, and is executed by a special or general purpose digital computer, such as a personal computer (PC; IBM-compatible, Apple-compatible, or otherwise), workstation, minicomputer, or mainframe computer. An example of a general purpose computer that can implement the ATM header compression method and process is shown in FIG. 7. In FIG. 7, the ATM header compression method and process is denoted by reference numeral 91.

Generally, in terms of hardware architecture, as shown in FIG. 7, the computer 129 includes a processor 132, memory 134, and one or more input and/or output (I/O) devices 136 (or peripherals) that are communicatively coupled via a local interface 138. The local interface 138 can be, for example but not limited to, one or more buses or other wired or wireless connections, as is known in the art. The local interface 138 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 132 is a hardware device for executing software, particularly that stored in memory 134. The processor 132 can be any custom made or commercially available processor, a central processing unit (CPU), an auxiliary processor among several processors associated with the computer 129, a semiconductor based microprocessor (in the form of a microchip or chip set), a macroprocessor, or generally any device for executing software instructions.

The memory 134 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 134 may incorporate electronic, magnetic, optical, and/or other types of storage media. Note that the memory 134 can have a distributed architecture, where various components are situated remote from one another, but can be accessed by the processor 132.

The software in memory 134 may include one or more separate programs, each of which comprises an ordered listing of executable instructions for implementing logical functions. In the example of FIG. 7, the software in the memory 134 includes the ATM header compression method and process 91 in accordance with the present invention and a suitable operating system (O/S) 22. A non-exhaustive list of examples of suitable commercially available operating systems 22 is as follows: (a) a Windows operating system available from Microsoft Corporation; (b) a NetWare operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in hand-held computers or personal data assistants (PDAs) (e.g., PalmOS available from Palm Computing, Inc., and Windows CE available from Microsoft Corporation). The operating system 22 essentially controls the execution of other computer programs, such as the ATM header compression method and process 91, and provides scheduling, input-output control, file and data management, memory management, and communication control and related services.

The ATM header compression method and process 91 is a source program, executable program (object code), script, or any other entity comprising a set of instructions to be performed. When a source program, then the program needs to be translated via a compiler, assembler, interpreter, or the like, which may or may not be included within the memory 134, so as to operate properly in connection with the O/S 136. Furthermore, the ATM header compression method and process 91 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 140 may include input devices, for example but not limited to, a keyboard, mouse, scanner, microphone, etc. Furthermore, the I/O devices 140 may also include output devices, for example but not limited to, a printer, display, etc. Finally, the I/O devices 140 may further include devices that communicate both inputs and outputs, for instance but not limited to, a modulator/demodulator (modem; for accessing another device, system, or network,), a radio frequency (RF) or other transceiver, a telephonic interface, a bridge, a router, etc. The one embodiment among other, at least one of the I/O devices is a DSL modem.

When the computer 129 is in operation, the processor 132 is configured to execute software stored within the memory 134, to communicate data to and from the memory 134, and to generally control operations of the computer 129 pursuant to the software. The ATM header compression system and method 91 and the O/S 22, in whole or in part, but typically the latter, are read by the processor 132, perhaps buffered within the processor 132, and then executed.

When the ATM header compression system and method 91 is implemented in software, as is shown in FIG. 1, it should be noted that the ATM header compression system and method 91 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The ATM header compression system and method 91 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the ATM header compression system and method 91 is implemented in hardware, it can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

We claim:

1. A method of compressing ATM headers in ATM cells for communication across an ATM network; comprising the steps of:

transmitting a first ATM header in an uncompressed format to a receiver in the ATM network;

generating a compressed ATM header for an ATM cell from a second uncompressed ATM header that corresponds to a data payload, wherein the data payload is to be communicated across the ATM network and wherein the compressed ATM header comprises information corresponding to bits of the second uncompressed ATM header that differ relative to the first ATM header; and transmitting the ATM cell with the compressed ATM header and the data payload to the receiver, wherein the compressed ATM header enables transmission of a greater number of ATM cells than the second uncompressed ATM header.

2. The method of claim 1, wherein the compressed ATM header is generated and transmitted to the receiver periodically to indicate to the receiver that the first ATM header corresponds to the transmitted ATM cell.

3. The method of claim 1, wherein the compressed ATM header is a dictionary indicating to the receiver the changes to be made in the bits of the first ATM header relative to headers for subsequently transmitted ATM cells.

4. The method of claim 1, wherein the compressing step is performed by a computer.

5. A system for compressing ATM headers in ATM cells for communication across an ATM network; comprising:

a computer, wherein the computer includes an ATM interface coupled to the ATM network;

logic configured for the ATM interface to transmit a first ATM header in an uncompressed format to a receiver in the ATM network;

logic configured to generate a compressed ATM header for an ATM cell from a second uncompressed ATM header that corresponds to a data payload, wherein the compressed ATM header comprises information corresponding to bits of the second uncompressed ATM header that differ relative to the first ATM header; and logic configured to transmit the ATM cell with the compressed ATM header and the data payload to the receiver.

6. The system of claim 5, wherein the compressed ATM header is generated and transmitted to the receiver periodically to indicate to the receiver that the first ATM header is to be used for the ATM cell.

7. The system of claim 5, wherein the compressed ATM header is a dictionary header indicating to the receiver the changes to be made to the first ATM header.

8. A method of compressing ATM headers for communication across an ATM network; comprising the steps of:

transmitting an initial full ATM header and a first data payload to a receiver in the ATM network;

determining that a second data payload is available for transmission to the receiver;

generating a delta encoded compressed ATM header from an uncompressed ATM header corresponding to the second data payload based on changed bits in the uncompressed ATM header for the second data payload as compared to the initial full ATM header, wherein the delta encoded compressed ATM header is one to five bytes in size depending upon a number and index location of the changed bits; and transmitting the delta encoded compressed ATM header and the second data payload to the receiver.

9. The method of claim 8, further comprising the steps of:

creating the delta encoded compressed ATM header according to a first delta encoding technique when a select number of bits of the uncompressed ATM header for the second data payload as compared to the previous uncompressed ATM header are unchanged.

10. The method of claim 9, wherein the delta encoded compressed ATM header is one byte.

11. The method of claim 9, wherein the select number of bits that are unchanged are bits residing in bit index locations 7 to 31.

12. The method of claim 8, further comprising the steps of:

creating the delta encoded compressed ATM header according to a second delta encoding technique when a minimum changed indexed bit and a maximum changed indexed bit in the uncompressed ATM header for the second data payload as compared to the previous uncompressed ATM header are within a same encoded byte.

13. The method of claim 12, wherein the delta encoded compressed ATM header is two bytes.

14. The method of claim 8, further comprising the steps of:

creating the delta encoded compressed ATM header according to a third delta encoding technique when a minimum changed indexed bit and a maximum changed indexed bit in the uncompressed ATM header for the second data payload as compared to the previous uncompressed ATM header are not within a same encoded byte.

15. The method of claim 8, further comprising the steps of:

initiating a refresh counter to determine a time to send a refresh byte in the delta encoded compressed ATM header.

16. The method of claim 15, further comprising the steps of:

determining whether the refresh counter has reached a threshold value.

17. The method of claim 16, wherein the refresh counter is incremented if the refresh counter has reached the threshold value.

18. The method of claim 16, wherein a refresh byte is added to the uncompressed ATM header for the second data payload if the refresh counter has not reached the threshold value.

19. The method of claim 16, wherein the refresh counter is restarted upon the refresh byte being added to the ATM header for the second data payload.

20. The method of claim 8, further comprising the steps of:

dropping one byte of the uncompressed ATM header for the second data payload corresponding to header error control bits prior to the generating step.

21. The method of claim 8, further comprising the steps of:

sending an idle byte if the second data payload is not available for transmission to the receiver.

22. A computer for communicating compressed ATM headers over an ATM network, comprising:

a processor;

a computer memory;

a communications interface, the communications interface being communicably coupled to the ATM network;

logic configured to transmit an initial full ATM header and a first data payload to a receiver in the ATM network;

logic configured to generate a compressed ATM header from an uncompressed ATM header corresponding to a second data payload, wherein the compressed ATM header comprises information corresponding to bits of the uncompressed ATM header that differ relative to a previous uncompressed ATM header, and wherein the length of the compressed ATM header corresponds to a number and index location of differential bits; and logic configured to transmit the compressed ATM header and the second payload to the receiver in the ATM network.

23. The computer of claim 22, further comprising:

logic configured to encode the compressed ATM header according to a first delta encoding technique if a select number of bits of the uncompressed ATM header for the second data payload as compared to the previous uncompressed ATM header data payload are unchanged.

24. The computer of claim 22, further comprising:

logic configured to encode the compressed ATM header according to a second delta encoding technique if a minimum changed indexed bit and a maximum changed indexed bit in uncompressed ATM header for the second data payload as compared to the previous uncompressed ATM header are within a same encoded byte.

25. The computer of claim 22, further comprising:

logic configured to encode the compressed ATM header according to a third delta encoding technique if a minimum changed indexed bit and a maximum changed indexed bit in the uncompressed ATM header for the second data payload as compared to the previous uncompressed ATM header are not within a same encoded byte.

26. The computer of claim 22, further comprising:

logic configured to drop one byte of the uncompressed ATM header for the second data payload corresponding to header error control bits prior to generating the compressed ATM header.

27. A system for communicating compressed ATM headers over an ATM network, comprising:

means for processing instructions;

means for storing data electronically;

means for generating an initial full ATM header and a first data payload for transmission to a receiver in the ATM network;

means for generating a compressed ATM header from an uncompressed ATM header for a second data payload wherein the compressed ATM header comprises information corresponding to bits of the uncompressed ATM header that differ relative to a previous uncompressed header, and wherein the length of the compressed ATM corresponds to a number and index location of differential bits; and means for communicating the compressed ATM header and the second data payload to the receiver in the ATM network.

28. The system of claim 27, further comprising:

means for compressing the ATM header according to a first delta encoding technique if a select number of bits of the uncompressed ATM header for the second data payload as compared to the previous uncompressed ATM header data payload are unchanged.

29. The system of claim 27, further comprising:

means for compressing the ATM header according to a second delta encoding technique if a minimum changed indexed bit and a maximum changed indexed bit in the uncompressed ATM header for the second data payload as compared to the previous uncompressed ATM header are within a same encoded byte.

30. The system of claim 27, further comprising:

means for compressing the ATM header according to a third delta encoding technique if a minimum changed indexed bit and a maximum changed indexed bit in the uncompressed ATM header for the second data payload as compared to the previous uncompressed ATM header are not within a same encoded byte.

* * * * *